No. 858,374. PATENTED JULY 2, 1907.
A. DYER.
LINE HOLDER.
APPLICATION FILED OCT. 29, 1906.

Witnesses.
A. H. Opsahl.
Malie Hoel.

Inventor.
Arthur Dyer.
By his Attorneys
Williamson Merchant.

UNITED STATES PATENT OFFICE.

ARTHUR DYER, OF DEEPHAVEN, MINNESOTA.

LINE-HOLDER.

No. 858,374.   Specification of Letters Patent.   Patented July 2, 1907.

Application filed October 29, 1906. Serial No. 341,008.

*To all whom it may concern:*

Be it known that I, ARTHUR DYER, a citizen of the United States, residing at Deephaven, in the county of Hennepin and State of Minnesota, have invented certain new and useful Improvements in Line-Holders; and I do hereby declare the following to be a full, clear, and exact description of the invention, such as will enable others skilled in the art to which it appertains to make and use the same.

My invention has for its object to provide an improved line holder or fastener, and to this end it consists of the novel device and arrangement of parts hereinafter described and defined in the claims.

The invention is illustrated in the accompanying drawings, wherein like characters indicate like parts throughout the several views.

Figure 1:
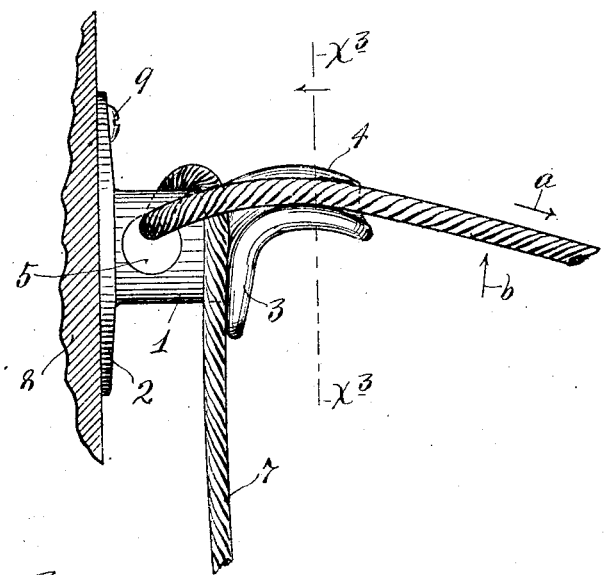
Figure 3:
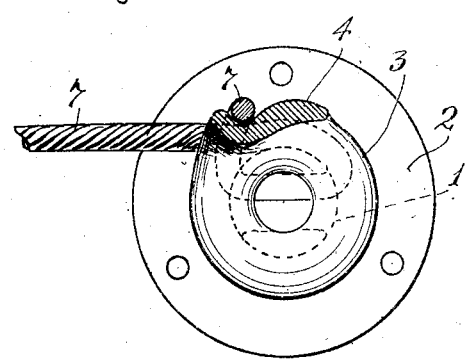
Figure 2:
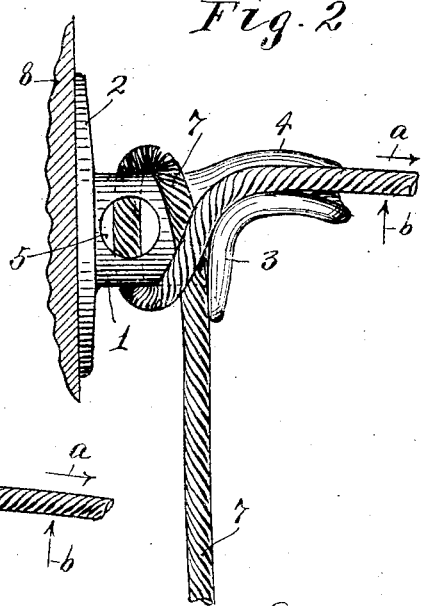

Referring to the drawings, Figures 1 and 2 are plan views showing the improved line holder or fastener, and showing a line or rope held thereby. Fig. 3 is a section taken on the line $x^3$ $x^3$ of Fig. 1, and Fig. 4 is a plan view illustrating a slightly modified form of the improved line holder or fastener.

The improved line holder or fastener is made from a single piece of metal, preferably in the form of a casting, such as a malleable iron or brass casting. It comprises a neck portion 1, a base flange 2 and a head 3, which head is formed with an outwardly extended and preferably slightly curved guide arm 4 that is slightly channel-shaped in cross section. In the preferred form of the device, there is a perforation 5 extended diametrically through the neck 1; and in the construction illustrated in Fig. 4, an anti-friction sheave 6 is journaled in the said perforation 5.

The numeral 7 indicates a line or rope, and the numeral 8 indicates a support to which the line holder or fastener is rigidly secured, preferably by means of screws 9 passed through the flange 2. The line or rope is adapted to be applied to and held by the holder in several different ways. In Figs. 1, 3 and 4 the line 7 is shown as passed through the perforation 5, while in Fig. 2 it is shown as wrapped completely around the neck 1. In each instance, however, the slack end of the rope or line is passed under the top portion of the rope or line, and is tightly pressed against the said neck and against the head 3, with a force that is proportional to the tension on the said line or rope. The top portion of the rope or line is extended over and guided by the channel-shaped arm 4 of the head 3, and is thereby held for a proper clamping action on the slack end of the rope or line. In Figs. 1, 2 and 4 the arrow marked "$a$" indicates the direction of the strain on the rope or line 7. By the arrangement described, the line or rope will be tightly held as long as there is tension on the taut portion of the same, but as soon as this normally taut portion is given slack, the slack portion of the same will be released and the line will then release itself from the holder. The sheave 6 shown in Fig. 4, makes the removal of the rope from the holder a more easy matter after it has been once released.

Figure 4:
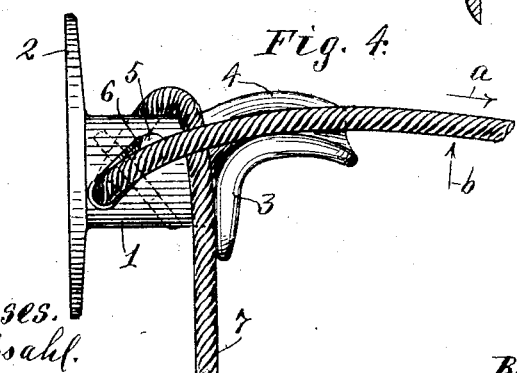

From what has been said, it is evident that any considerable force, such as that which would be given by a swinging boom of a sail-boat striking the top portion of the line in the direction of the arrows marked "$b$" on the Figs. 1, 2 and 4, will release the line from the holder. This feature particularly adapts the holder for use as a "jam cleat" or as a "fair leader" for sail-boats, but when used as a "jam cleat" the rope or line would be applied around the neck 1, as shown in Fig. 2, while when used as a "fair leader" the rope or line would be applied through the perforation 5 of the neck 1, as shown in Figs. 1, 3 and 4.

The device described, while of small cost, is highly efficient for the purposes had in view.

What I claim is:

1. A line holder or fastener comprising a neck 1 having a base 2 and a head 3, the said head 3 being formed with a channel-shaped guide arm 4 that is curved longitudinally and extends in a general direction approximately in line with the said neck 1, substantially as described.

2. A line holder or fastener comprising a neck having a diametrical perforation and a flange head, said head having a channel-shaped guide arm that extends in a general direction approximately in line with the said neck, substantially as described.

3. A line holder or fastener comprising a neck 1 provided with a base 2, a diametrical perforation 5, a flange head 3, said head having a channel-shaped guide arm 4, and a sheave 6 mounted in said perforation 5, substantially as described.

In testimony whereof I affix my signature in presence of two witnesses.

ARTHUR DYER.

Witnesses:
 MALID HOEL,
 F. D. MERCHANT.